United States Patent [19]

Kak et al.

[11] Patent Number: 5,426,721
[45] Date of Patent: Jun. 20, 1995

[54] NEURAL NETWORKS AND METHODS FOR TRAINING NEURAL NETWORKS

[75] Inventors: Subhash Kak; John F. Pastor, both of Baton Rouge, La.

[73] Assignee: Board of Supervisors of Louisiana State University and Agricultural and Mechanical College, Baton Rouge, La.

[21] Appl. No.: 80,490

[22] Filed: Jun. 17, 1993

[51] Int. Cl.⁶ .................................................. G06F 15/18
[52] U.S. Cl. ........................................ 395/27; 395/23
[58] Field of Search ..................... 395/11, 23, 24, 27

[56] References Cited

U.S. PATENT DOCUMENTS

| | | | |
|---|---|---|---|
| 5,052,043 | 9/1991 | Gaborski | 395/22 |
| 5,060,278 | 10/1991 | Fukumizu | 395/11 |
| 5,095,443 | 3/1992 | Watanabe | 395/23 |
| 5,155,801 | 10/1992 | Lincoln | 395/21 |
| 5,167,006 | 11/1992 | Furuta et al. | 395/27 |
| 5,214,747 | 5/1993 | Cok | 395/27 |
| 5,239,594 | 8/1993 | Yoda | 395/23 |
| 5,295,227 | 3/1994 | Yokono | 395/11 |

OTHER PUBLICATIONS

Brodsky et al, "Binary Backpropagation in Content Addressable Memory", 1990 ISCNN, pp. 205–210 vol. 3, Jun. 17–21 1990.

Rumelhart et al., "Learning Internal Representations by Error Propagation" in Rumelhart et al. (Eds.), *Parallel Distributed Processing: Explorations in the Microstructure of Cognition. vol. 1: Foundations*, pp. 318–362 (1986).

Lippmann, "An Introduction to Computing with Neural Nets," IEEE ASSP Magazine, pp. 4–22 (Apr. 1987).

*Primary Examiner*—Allen R. MacDonald
*Assistant Examiner*—Thomas Onka
*Attorney, Agent, or Firm*—John H. Runnels

[57] ABSTRACT

Novel neural networks and novel methods for training those networks are disclosed. The novel networks are feedforward networks having at least three layers of neurons. The training methods are easy to implement, converge rapidly, and are guaranteed to converge to a solution. A novel network structure is used, in which each corner of the input vector hypercube may be considered separately. The problem of mapping may be reduced to a sum of corner classification sub-problems. Four efficient, alternative classification methods for use with the novel neural networks are also disclosed.

8 Claims, 3 Drawing Sheets

NEURAL NETWORKS AND METHODS FOR TRAINING NEURAL NETWORKS

This invention pertains to novel neural networks, and to novel methods for training those neural networks.

A neural network is a set of computational units which are interconnected in a manner generally analogous to the interconnections of biological neurons. A circuit which resembles in some way the interconnections of biological neurons may be called a neural network. Each computational unit comprises a neuron, one or more inputs, one or more outputs, and means to transform the input signals into output signals. The interconnections between neurons are typically given different weights. An input for one neuron may be connected to an external input source, or to the output of another neuron. Typical uses for neural networks are to learn facts or patterns, and to show associative recall of the stored patterns.

A multilayered neural network has one or more layers of "hidden" neurons between the input layer of neurons and the output layer of neurons. Multilayered networks are attractive for many types of problems because such networks have non-linear capabilities. The seemingly simple "Exclusive-Or" problem is a canonical example of a nonlinear problem.

Neural networks must generally be "trained" for a particular task. In other words, the network must learn a set of interconnection weights which are appropriate for a specified problem. Finding generally effective training methods for multi-layered networks has remained a difficulty. The so-called "back-propagation" training method has often been used, but this iterative method can be slow to converge to a solution. Furthermore, it may not always find a solution if the iterative steps converge to a local minimum rather than to the desired global minimum. See, e.g., Rumelhart et al., "Learning Internal Representations by Error Propagation" in Rumelhart et al. (Eds.), *Parallel Distributed Processing: Explorations in the Microstructure of Cognition. Vol. 1: Foundations*, pp. 318–362 (1986); and see generally Lippmann, "An Introduction to Computing with Neural Nets," IEEE ASSP Magazine, pp. 4–22 (April 1987).

Novel neural networks and novel methods for training those networks have been discovered. The novel networks are feedforward networks having at least three layers of binary neurons. The training method is easy to implement, converges rapidly, and is guaranteed to converge to a solution (provided only that the mapping is self-consistent). A novel network structure is used, in which each corner of the input vector hypercube may be considered separately. The problem of mapping may be reduced to a sum of corner classification sub-problems. Three highly efficient alternative training methods have also been discovered.

The novel methods are guaranteed to find a solution, and they provide an upper bound on the number of hidden neurons which are necessary for a specified mapping.

A n-dimensional "binary vector" is an ordered set of n elements, where each of the elements has one of two possible values: 1 or 0, on or off, true or false, high or low, etc. For example, (0 1 1 0 1 0) is a 6-dimensional binary vector. Consider the mapping Y=f(X), where X and Y are n- and m-dimensional binary vectors, respectively. The ultimate goal is to implement the mapping Y=f(X) on a neural network.

Figure 1:
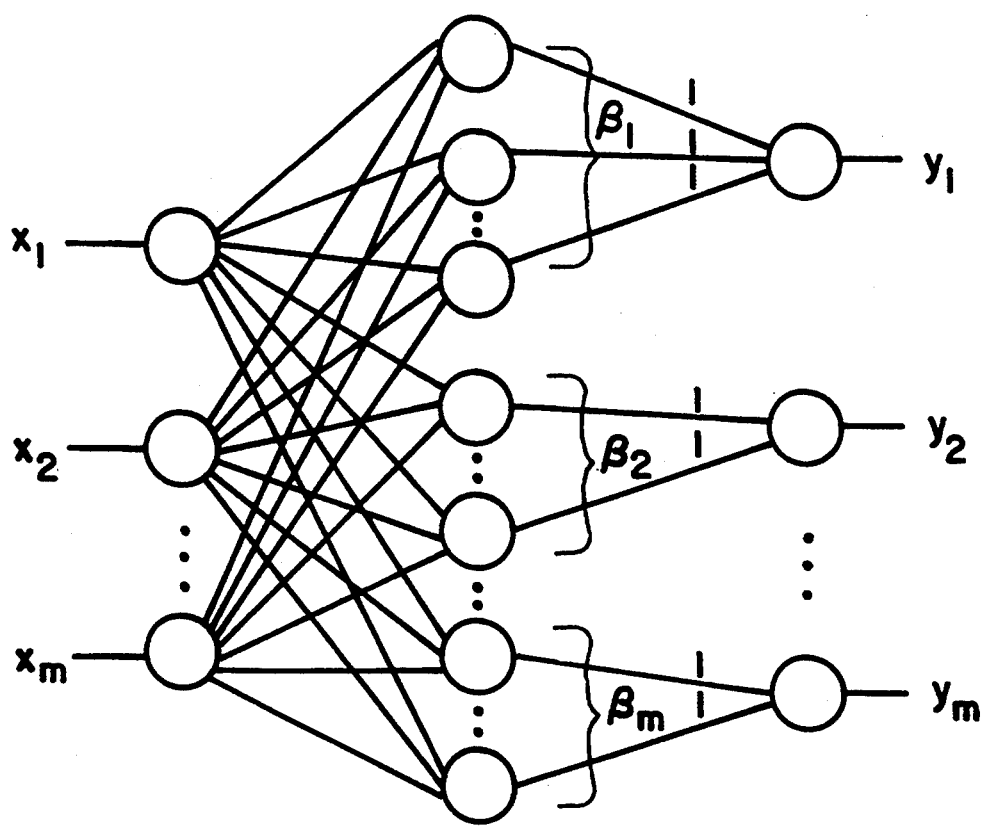
FIG. 1 illustrates an embodiment of a novel neural network architecture in accordance with the present invention.

Let the number of the sample vectors X used to train the network be k, so that we can write $Y^i = f(X^i)$, i=1, ..., k. A novel procedure is described below for realizing the mapping Y=f(X) with a 3-layered, "feedforward" network of binary neurons. (A "feedforward" network is one in which the flow of information from neuron to neuron is one-way; i.e., there is no feedback.) The three neuron layers are conventionally called the input neurons, the "hidden" neurons, and the output neurons. The input neurons distribute input data to the second layer, the "hidden" neurons. The hidden neurons perform intermediate calculations, whose results are distributed to the output neurons. The output neurons perform final calculations, and output the results. See, e.g., FIG. 1, illustrating an embodiment of the novel neural network architecture. In FIG. 1, note that each output neuron is associated with a distinct "subset neural network" of the overall neural network depicted. The numbers of input and the output neurons are n and m, respectively.

The output of a neuron is 1 if the weighted sum of the signals into the neuron is greater than the neuron's threshold T, and is 0 otherwise. The output $o_j$ of neuron j may be written as:

$$o_j = \begin{cases} 1 \text{ if } \Sigma\ w_{ij}x_i > T \\ 0 \text{ otherwise} \end{cases} \quad (1)$$

where $w_{ij}$ is the weight given to the ith input to the jth neuron.

For convenience only, we will typically add an extra constant value input to each neuron, so that the threshold for each neuron can be made equal to zero for simplicity. The weight given to this additional input can thus simulate any desired threshold value. Where a threshold is not otherwise specified, it will be assumed to be zero. The transformation $Y^i = f(X^i)$, i=1, ..., k may be written in the form of an array as follows:

| Sample | Input | Output |
|---|---|---|
| 1 | $x_{11} x_{12} \ldots x_{1n}$ | $y_{11} \ldots y_{1m}$ |
| 2 | $x_{21} x_{22} \ldots x_{2n}$ | $y_{21} \ldots y_{2m}$ |
| . | . | . |
| . | . | . |
| i | $x_{i1} x_{i2} \ldots x_{in}$ | $y_{i1} \ldots y_{ij} \ldots y_{im}$ |
| . | . | . |
| . | . | . |
| k | $x_{k1} x_{k2} \ldots x_{kn}$ | $y_{k1} \ldots y_{km}$ |

This array format emphasizes that the outputs may also be written as a sequence of m, k-dimensional vectors $W_j = (y_{1j} y_{2j} \ldots y_{kj})$.

The "weight" of a binary vector is defined to be the number of its elements having the value 1. The weight of $Y^i$ will be denoted $\alpha_i$, and the weight of vector $W_j=(y_{1j}y_{2j}\ldots y_{kj})$ will be denoted $\beta_j$.

For purposes of illustration, consider the output $y_1=(y_{11}y_{21}\ldots y_{k1})$. This output defines vector $W_1$. It will now be shown how this output may be obtained with a 3-layered network. The other m - 1 outputs may be obtained in an analogous fashion.

The $y_1$ values for the k samples determine the $W_1$ vector. By definition, $W_1$ has exactly $\beta_1$ elements of value 1. Thus the vector $W_1$ can be written as a sum of $\beta_1$ different binary vectors, each of which contains a single 1, and whose other elements are all 0. This is an important step in the novel technique. The next step is to classify the input n-dimensional vectors that produce a 1 in the output.

A single neuron suffices to realize each of these $\beta_1$ vectors. This fact may be visualized by placing the input $X^i$ vectors on the corners of an n-dimensional hypercube; each of these corners may be isolated with a single hyperplane. In other words, a total of $\beta_1$ neurons suffices to isolate the $\beta_1$ corners corresponding to the vector $W_1$. These $\beta_1$ "hidden" neurons, connected to the n input lines through weights that define appropriate hyperplanes, produce a 1 output for the specified input vectors. Then the outputs of these neurons are processed through a logical-Or operation to give the correct response for the output layer neuron. Therefore, the hidden neuron outputs may each be fed to a single output neuron, through links each having a weight of 1. The threshold of an output neuron should be less than 1, and greater than or equal to 0 to ensure a 1 output for all the corners that were isolated by the $\beta_1$ hidden layer neurons. (Recall that a neuron produces an output of 1 only when the sum of the inputs exceeds its threshold.) Although a zero threshold may suffice, it is preferred to use a higher threshold, such as one about $1/\beta_1$, to allow for possible noise.

This procedure may be followed for each of the m output neurons. The corner classification procedure guarantees the realization of the mapping.

In some cases, some of the hidden neurons generated by this procedure may be redundant or duplicative; removing redundant neurons can increase efficiency. Consider the following function:

$$\gamma_i = \begin{cases} \alpha_i - 1 \text{ if } \alpha_i > 1 \\ 0 \text{ if } \alpha_i = 1 \end{cases} \quad (2)$$

It has been found that the number of hidden neurons which are duplicative equals $\Sigma\gamma_i$. Thus the number of hidden neurons required to realize the mapping $Y^i=f(X^i)$, i=1, 2, ..., k is equal to $\Sigma\beta_i-\Sigma\gamma_i$. It also follows that the number of hidden neurons required to realize a mapping is at most k. Thus, while each output is associated with a "subset neural network" of the overall neural network, there may be overlap in the sense that a given "subset neural network" may feed to more than one output°

There are a number of ways to construct a set of weights to isolate a corner of the n-dimensional input vector cube. One way is as follows: An initial set of weights is chosen, perhaps at random. Whenever the neuron makes a mistake with a given input, the weights are changed to make the mistake less likely; this process is iterated for all neurons and for all sample inputs. This application of the so-called "perceptron" method will converge in a finite number of steps. Let the inputs and the weights be represented by the vectors $(x_1x_2\ldots x_n)$ and $(w_1w_2\ldots w_n)$, respectively. An extra input $x_{n+1}$ is assumed, having a constant value of 1, requiring the addition of an extra weight $w_{n+1}$. (Recall that the extra 1 input and the extra weight are used only to simulate the effect of the threshold, so that the actual threshold may be 0 in all cases if desired.) The perceptron method as applied to this problem may be stated as follows:

1. Start with any trial weight vector; the trial weight vector may be random, or may be the all-zero vector.
2. Feed a sample input vector to the network with the trial weight vector, and monitor an output neuron.
3. If the output is 0 when it should be 1, add the input vector to the trial weight vector.
4. If the output is 1 when it should be 0, subtract the input vector from the trial weight vector.
5. If the output is correct, leave the trial weight vector unchanged, and iterate steps 2–4 for all sample input vectors and all output neurons, until all outputs are correct for all sample inputs, at which point the now-converged trial weight vector may be considered the final weight vector.

A proof of these results is presented in Kak, "On training feedforward neural networks," Pramana Journal of Physics vol. 40, no. 1, pp. 35-42 (1993), the entire disclosure of which is incorporated by reference.

Example 1: The Exclusive-Or Mapping

The Exclusive-Or mapping is not linearly separable, and has therefore often been used as a benchmark to test neural network training methods. The Exclusive-Or mapping for the two inputs $x_1$ and $x_2$ is illustrated below:

| Sample | $x_1$ | $x_2$ | $x_3$ | Output |
|---|---|---|---|---|
| 1 | 0 | 0 | 1 | 0 |
| 2 | 0 | 1 | 1 | 1 |
| 3 | 1 | 0 | 1 | 1 |
| 4 | 1 | 1 | 1 | 0 |

This table shows the extra input $x_3=1$, used to allow the hidden layer neurons also to learn their thresholds.

For the Exclusive-Or mapping m=1, and $\Sigma\beta_i=2$. Thus two hidden layer neurons are needed for the mapping. The training method splits the output vector (0 1 1 0) into the sum of two component vectors, each having a single element of 1: (0 1 0 0) and (0 0 1 0).

The two input corners to be isolated are (0 1) and (1 0), because these inputs are the ones corresponding to a 1 output. The geometry of these two corners is such that the equations for the corresponding hyperplanes need not have constant terms. So for this example the weight component for $x_3$ turns out to be zero for each case, as we will see on the application of the corner classification algorithm.

The transformation to be realized for the first component output vector (0 1 0 0) is:

| Sample | $x_1$ | $x_2$ | $x_3$ | Output |
|---|---|---|---|---|
| 1 | 0 | 0 | 1 | 0 |
| 2 | 0 | 1 | 1 | 1 |
| 3 | 1 | 0 | 1 | 0 |
| 4 | 1 | 1 | 1 | 0 |

This transformation can be realized by the weights (−1 1 0), which may be obtained with the corner classification method described above. Starting with a zero trial weight vector (0 0 0), the sequence converges in two steps:

| | |
|---|---|
| 0 0 0 | (initial trial weights) |
| 0 1 1 | (first iteration) |
| −1 1 0 | (second, converged iteration) |

The weights are obtained in 2 steps. (The calculations of the intermediate steps in the method are not shown, but may readily be followed by applying the 5-step method described above.) Note that these weights work because the threshold has been taken to be zero.

Now consider the second basis transformation:

| Sample | $x_1$ | $x_2$ | $x_3$ | Output |
|---|---|---|---|---|
| 1 | 0 | 0 | 1 | 0 |
| 2 | 0 | 1 | 1 | 0 |
| 3 | 1 | 0 | 1 | 1 |
| 4 | 1 | 1 | 1 | 0 |

Application of the same method gives the sequence:

| | | |
|---|---|---|
| 0 | 0 | 0 |
| 1 | 0 | 1 |
| 0 | −1 | 0 |
| 1 | −1 | 1 |
| 0 | −2 | 0 |
| 1 | −2 | 1 |
| 1 | −2 | 0 |

Six iterations were needed to obtain these weights. With the weights for the input layer, the design is now complete, because the weights in the output layer are all equal to 1. The threshold of the neuron in the output layer may be set to be $1/\beta_1 = 0.5$, or indeed any suitable non-negative value.

Figure 2:
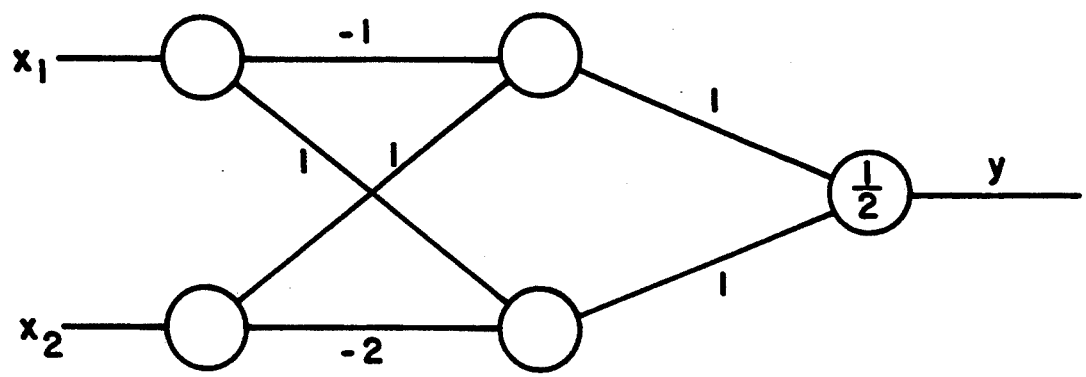
FIG. 2 illustrates an embodiment of the present invention which maps the Exclusive-Or function for two variables.

The resulting network to realize the Exclusive-Or mapping is illustrated in FIG. 2. The total number of iterative steps required was a mere 8. By contrast, it has been reported that 6,587 iterations were required to solve the same problem with the basic backpropagation algorithm (although modifications to the basic backpropagation algorithm might reduce the number of iterations required somewhat.) See Rumelhart et al., Parallel Distributed Processing, vol. 1, p. 332 (1986). The backpropagation algorithm encounters such difficulty because unlike the present invention, it does not take advantage of the structure of the training samples.

In other experiments done in our laboratory (data not shown), the novel feedforward method has exhibited a neural network training time about 50 times faster than that of the backpropagation method; it is expected that this training-time-differential factor will increase as the size of a problem increases. The greatly reduced training time required by the novel networks can be very important in addressing real-time or near-real-time neural network calculations. The generalization performance of the novel networks in the experiments was often as good as that of backpropagation-generated networks, but in some cases was slightly less.

Example 2

Consider the mapping shown below, with $x_5$ as a constant input for training the neuron thresholds.

| Sample | $x_1$ | $x_2$ | $x_3$ | $x_4$ | $x_5$ | $y_1$ | $y_2$ |
|---|---|---|---|---|---|---|---|
| 1 | 0 | 1 | 1 | 1 | 1 | 1 | 0 |
| 2 | 1 | 0 | 1 | 1 | 1 | 1 | 1 |
| 3 | 1 | 0 | 0 | 0 | 1 | 0 | 1 |
| 4 | 0 | 1 | 1 | 0 | 1 | 0 | 0 |
| 5 | 1 | 1 | 0 | 0 | 1 | 0 | 0 |

By inspection, $\beta_1 = 2$ and $\beta_2 = 2$. An initial design would therefore require $2+2=4$ hidden neurons. However, by inspection $\alpha_2 = 2$, meaning that the number of hidden neurons may be reduced by one. Thus three hidden neurons are needed.

Figure 3:
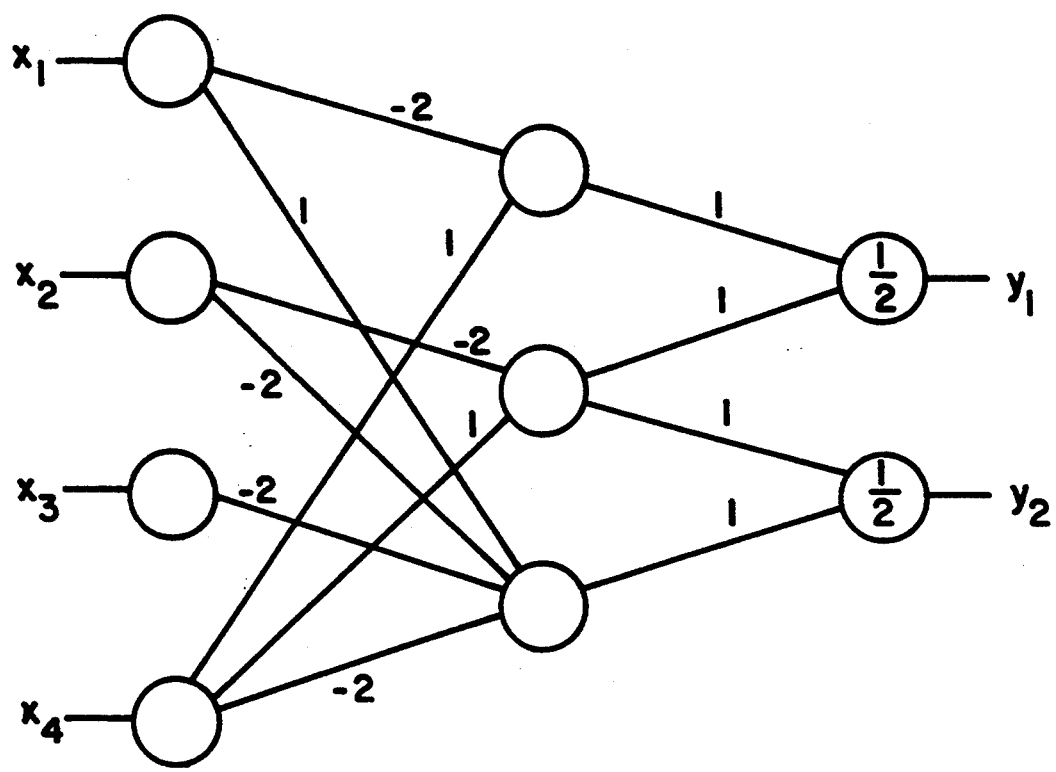
FIG. 3 illustrates an embodiment of the present invention which maps a specified, arbitrary function.

The weights (−2 0 0 1 0) and (0 −2 0 1 0) were found to represent solutions for the output $y_1$. (The starting weight vectors used were randomly chosen, and were not all 0.) Likewise, the weights (0 −2 0 1 0) and (1 −2 −2 −2 0) are found to classify the corners for the output $y_2$. Because two of these 4 hidden neurons are identical, one of them may be deleted. The final design is illustrated in FIG. 3.

A First Alternative Classification Method

Following is a description of an alternative method of isolating the corners of the n-dimensional input vector hypercube.

We wish to isolate the input vector $X^i$ by a hidden neuron. The hidden neuron should produce a 1 corresponding to this input, and a 0 corresponding to all other inputs. This result can be achieved By using weights which are positively correlated with $X^i$, and which are negatively correlated with all other input vectors.

Let the inputs (including an extra $x_{n+1} = 1$ input for learning the thresholds) and the weights be represented by vectors $X^+ = (x_1 x_2 \ldots x_n x_{n+1})$ and $W^+ = (w_1 w_2 \ldots w_n w_{n+1})$, respectively. (The "+" superscript signifies the addition of the extra (n+1)st term in each vector.) First, we assign $w_{n+1} = 1$ for the all-zero vector. The least integer value which $w_{n+1}$ may assume is 1, because there are no non-zero values in this vector with which to establish a positive correlation. This choice then forces the $w_{n+1}$ values for all other vectors to be either zero or negative. For the other cases we assign $w_{n+1} = 1 - S_i$, where $S_i$ is the weight of the sequence $X^i$; this weighting ensures that sequences with lower weights are not classified. (Note that the weight of the all-zero sequence is 0; therefore, the $w_{n+1}$ required to classify it is $1 - 0 = 1$, consistent with the above result.) To establish negative correlation the weight $w_i$ for an $x_i = 0$ is taken to be −1. The resulting values of $w_{n+1}$ become increasingly more negative for $X^i$'s of larger weight, defining hyperplanes moving further away from the origin.

To summarize, the weights are as follows:

$$w_j = \begin{cases} -1 & \text{if } x_j = 0 \\ 1 & \text{if } x_j = 1 \\ 1 - s_i & \text{for } j = n + 1 \end{cases} \qquad (3)$$

The value of $w_j = 1 - S_i$ implies that the threshold of the hidden neuron to separate this sequence is $S_i - 1$.

The weights established by this method are one possible set of solutions for the mapping problem, a set of weights which represents the smallest integer values which will solve the problem.

Example 3: The Exclusive-Or Mapping

| Sample | $x_1$ | $x_2$ | $x_3$ | Output |
|---|---|---|---|---|
| 1 | 0 | 0 | 1 | 0 |
| 2 | 0 | 1 | 1 | 1 |
| 3 | 1 | 0 | 1 | 1 |
| 4 | 1 | 1 | 1 | 0 |

As before, m=1 and $\Sigma\beta_i=2$, so 2 hidden neurons are needed.

Using our corner classification formula, the weight vectors corresponding to $X^2$ and $X^3$ with this method are readily seen to be (−1 1 0) and (1 −1 0) by inspection. The fact that $w_3$ is 0 in both cases means that the threshold of both hidden neurons is 0.

A Second Alternative Classification Method

A variation on the first alternative classification method can yield better generalization capabilities than the first alternative method, but still demonstrate rapid training times. The weights are initially assigned as in the first alternative method described above. Then the weights are randomly raised by an amount $r_j$, without changing the threshold values: for each j=1, 2, ..., n, $w_j$ is raised by an amount $r_j$ randomly chosen from the interval [0, R), R<1. (For example, R may be taken to be 0.5.)

After adding these random factors, the weights are updated as described below. For each j=1, ..., i−1, i+1, ..., k, the indices of the remaining input vectors in the training set, one calculates the inner product $S = X^{j+} \cdot W^+$. If S>0, one does either of the following:

(a) Find an l such that $X^i{}_l=0$ and $X^j{}_l=1$; and update $w_l$ to be $w_l - S$; or (b) Find an l such that $X^i{}_l=1$ and $X^j{}_l=0$; and update $w_l$ to be $w_l + S$; and also update $W_{n+1}$ to be $w_{a+} - S$.

This procedure thus increases the correlation between w and $X^i$, and reduces the correlation between w and the other input vectors in the training set. Note that, unlike the "perceptron" approach, this method requires only one pass through the input vectors of a training set to converge.

Example 4, Using the Second Alternative Classification

This example is based on the problem of predicting a particular bond's interest rate for the next month, based on its monthly interest rate for each of the previous eight months. (Actual historical financial data were used, but are not shown here.) If the interest rate is represented by a three bit binary sequence, a 24-bit input vector will represent a bond's monthly interest rate for the eight preceding months, and a three-bit output will represent the predicted interest rate for the ninth month.

The training set consisted of 52 input-output pairs obtained from actual historical financial data. Table 1 shows a comparison of the time required to learn the 52 input-output pairs of the training set with the two "generalizable" classification methods discussed thus far. Training time was measured by the number of times a weight vector was updated, and by the number of passes made through the input vectors of the training set. Note that the number of passes required by the one-pass classification scheme equals the number of hidden neurons in the network.

TABLE 1

|  |  | no. of updates | no. of passes |
|---|---|---|---|
| Sample 1 | original method | 920 | 444 |
|  | 2nd alternative | 32 | 48 |
| Sample 2 | original method | 800 | 391 |
|  | 2nd alternative | 41 | 49 |

After the training was completed, input vectors from outside the training set were presented to the network. The network's predictions were compared to the actual ninth month interest rate. The generalization capability provided by each of the two classification algorithms was compared by comparing the percentage of predictions which were within a specified percent of the actual rate. This comparison is shown in Table 2.

TABLE 2

|  |  | Percent Difference from Actual Rate | | | | |
|---|---|---|---|---|---|---|
|  |  | 0% | 5% | 10% | 15% | 20% |
| Sample 1 | original | 40% | 66% | 100% | 100% | 100% |
|  | 2nd altern. | 55% | 60% | 90% | 93% | 100% |
| Sample 2 | original | 20% | 33% | 53% | 80% | 93% |
|  | 2nd altern. | 33% | 60% | 82% | 89% | 100% |

A Third Alternative Classification Method

A third alternative is a generalization of the second alternative. First, $W^+$ is initialized so that it is highly correlated with the corner it classifies, and is correlated weakly, negatively, or not at all with the other input vectors. The initialization may include a representation of the relative importance of each of the n bits. Thus for j=1, ..., n, we initially take $w_j = p(j)$ if $x_{ij}=1$; and $w_j = -p(j)$ if $x_{ij}=0$, where p(j) is a function assigning higher or lower priority to bit j, depending on its relative importance.

Next, set $w_{a+1} = R - (p(1)x_{i1} + p(2)x_{i2} + \ldots + p(n)x_{in})$, where R is a function of the p (j)'s; for example, $R = (p(1) + \ldots + p(n))/n$.

Note that if p(i)=1 for all values of i, this initialization is the same as that for the first alternative classification method above.

Next, randomly adjust the weights—typically the weights should be raised more frequently than they are lowered, in order to give better generalization by increasing positive correlations. I.e., update $w_j$ by replacing it with $w_j + r_j$, where $r_j \in [a, b]$; where typically a<0<b, and $|a| << |b|$.

Then the weights are adjusted as follows. For j ∈ {1, 2, ..., i−1, i+1, ..., k}, calculate $s = W^+ \cdot X^{j+}$. If S>0, a positive integer T is chosen, and the following two steps are iterated T times:

(1) Choose an integer l such that $x_{jl}$ is not equal to $x_{il}$.

(2) If $x_{il}=1$, raise $w_l$ by s/T, and lower $w_{n+1}$ by s/T. If $x_{il}=0$ lower $w_l$ by s/T.

Example 5, Using The Third Alternative Method As an example, again consider the following function of two binary variables:

| Input | Output |
|---|---|
| 0 0 | 0 |
| 0 1 | 1 |
| 1 0 | 1 |

| Input | Output |
|---|---|
| 1 1 | 0 |

Let
$X^1 = [0\ 0]$
$X^2 = [0\ 1]$
$X^3 = [1\ 1]$
$X^4 = [1\ 1]$

The feedforward network may thus consist of (a) three input neurons, where the third input has a constant value of 1; (b) two hidden neurons; and (c) one output neuron. The first hidden neuron classifies $X^2$, and the second hidden neuron classifies $X^3$. We need to select appropriate three-dimensional weight vectors $w_i$ for i=1 and 2.

Case 1 Suppose both bits are given equal priority. Then $p(1)=p(2)=1$, and $R=1$. First we take as initial values $w_1=[-1\ 1\ 0]$ and $w_2=[1\ -1\ 0]$. With the p's equal, these initial values are in accordance with the first alternative classification. Next, we randomly adjust by adding numbers in the interval $[-0.05, 0.35]$, giving weight vectors $w_1=[-0.81\ 1.02\ 0]$ and $w_2=[0.96\ -1.04\ 0]$.

Then the weights are adjusted as described above. For example, to adjust $w_1$, we calculate $X^i \cdot w_1$ for each $i \neq 2$, where a third bit equal to 1 is added to each input vector X. This inner product exceeds 0 only in the case of $X^4 \cdot w_2 = 1.02 - 0.81 = 0.21$. Because $x_{2i} \neq x_{4i}$ only for i=1, we lower $w_{11}$ by 0.21, giving $w=[-1.02\ 1.02\ 0]$.

For $w_2$, we calculate $X^i \cdot w_2$ for each $i \neq 3$. None of these inner products exceeds 0, so $w_2$ remains $[0.96\ -1.04\ 0]$.

Case 2 For the same mapping, suppose that each input vector is a 2-bit binary representation of an integer between 0 and 3. The left bit is thus more significant than the right. This greater significance may be expressed by setting $p(1)=1$, and $p(2)=0.5$. Then $R=(1+0.5)/2=0.75$, and the above procedure gives as initial weightings $w_1=[-1\ 0.5\ 0.25]$ and $w_2=[1\ -0.5\ -0.25]$.

Randomly adjusting the weights with the same components in the interval $[-0.05, 0.35]$ as in Case 1 yields $w_1=[-0.81\ 0.52\ 0.25]$ and $w_2=[0.96\ -0.54\ -0.25]$. Then, adjusting the weights as provided in the last step above, the final $w_1$ remains $[-0.81\ 0.52\ 0.25]$. Because $X^4 \cdot w_2 = 0.17$, we decrease $w_{22}$ by 0.17, to give a final $w_2$ of $[0.96\ -0.71\ -0.25]$.

General

Individual neurons in accordance with the present invention may be formed from any electrical, electronic, or logical devices which perform the indicated functions. Such devices are well known to the art, and their details are therefore not further specified.

It is intended that these inventions include any equivalents to the descriptions contained in the specification and claims, such as would result, for example, from substituting equivalent circuit elements, or from a transformation of the logic by an application of DeMorgan's Theorem.

We claim:

1. A circuit for mapping an n-bit binary input sequence into an m-bit binary output sequence, wherein n is a positive integer and m is a positive integer, said circuit comprising n input neurons, each said input neuron adapted to receive one bit of the n-bit binary input sequence; a plurality of hidden neurons, each of said hidden neurons having a threshold value; and m output neurons, each said output neuron adapted to output one bit of the m-bit binary output sequence; wherein said input neurons, said hidden neurons, and said output neurons comprise a plurality of neural networks, wherein each of said output neurons is associated with one of said neural networks, and wherein each of said neural networks comprises:

(a) said output neuron associated with said neural network;
(b) at least one of said hidden neurons;
(c) at least one of said input neurons;
(d) means, associated with each of said input neurons in said neural network, for distributing an input bit received by that neuron to at least one of said hidden neurons in said neural network;
(e) means, associated with each of said hidden neurons in said neural network, for receiving an input bit distributed from at least one of said input neurons in said neural network;
(f) means, associated with at least one of said hidden neurons in said neural network, for weighting at least one bit received by that hidden neuron;
(g) means, associated with each of said hidden neurons in said neural network, for sending a high signal to the output neuron of said neural network if, and only if, the arithmetic sum of the arithmetic products of each bit received by that hidden neuron multiplied by the weight given to that bit by said weighting means for that bit, or multiplied by zero if there be no said weighting means for that bit, exceeds the threshold value for that hidden neuron, and for outputting a low signal to the output neuron of said neural network otherwise;
(h) means, associated with said output neuron of said neural network, for weighting each high signal received by that output neuron equally with a fixed weight; and
(i) means, associated with said output neuron of said neural network, for outputting a high signal if said output neuron is sent a high signal by at least one of said hidden neurons of said neural network, and for outputting a low signal otherwise;

wherein for each of a plurality of said hidden neurons in said circuit, if the said hidden neuron is a component of one of said neural networks comprising one of said output neurons, then the said hidden neuron is not a component of any of said neural networks which comprises any other of said output neurons.

2. A circuit as recited in claim 1, wherein each of said hidden neurons has said weighting means as defined in part (f) of claim 1, and wherein for each of said hidden neurons in said circuit, if the said hidden neuron is a component of one of said neural networks comprising one of said output neurons, then the said hidden neuron is not a component of any of said neural networks which comprises any other of said output neurons.

3. A circuit as recited in claim 1, wherein each of said hidden neurons has said weighting means as defined in part (f) of claim 1, and wherein the weight vector for each of said hidden neurons is defined to be an ordered set $w = w_1 w_2 \ldots w_l \ldots w_n$, wherein $w_l$ denotes the weighting given by said weighting means to the l-th input bit for said hidden neuron, and wherein each of said weight vectors is equal to a weight vector constructed by a process comprising the steps of:

(a) selecting a sample comprising a set of k n-bit binary input sequences x, a set of k m-bit binary output sequences y, and a correlation defining for each input sequence x a corresponding output sequence y, where said correlations are in the form:

| Sample | Input | Output |
|---|---|---|
| 1 | $x_{11} x_{12} \ldots x_{1n}$ | $y_{11} \ldots y_{1m}$ |
| 2 | $x_{21} x_{22} \ldots x_{2n}$ | $y_{21} \ldots y_{2m}$ |
| . | . | . |
| . | . | . |
| . | . | . |
| i | $x_{i1} x_{i2} \ldots x_{in}$ | $y_{i1} \ldots y_{ij} \ldots y_{im}$ |
| . | . | . |
| . | . | . |
| . | . | . |
| k | $x_{k1} x_{k2} \ldots x_{kn}$ | $y_{k1} \ldots y_{km}$ ; |

(b) generating, for each $y_{ij}$ having a high value, a weight vector $w = w_1 w_2 \ldots w_p \ldots w_n$; and (c) for each $y_{ij}$ having a low value, either generating no weight vector w, or, equivalently, setting all elements of weight vector w equal to 0;

wherein k is a positive integer greater than or equal to 2; wherein l is a positive integer such that $1 \leq l \leq n$; wherein i is a positive integer such that [$1 \leq l \leq k$;] $2 \leq l \leq k$; and wherein j is a positive integer such that $1 \leq l \leq m$.

4. A circuit as recited in claim 3, wherein said generating of each of said weight vectors w in step (b) of claim 3 comprises the following iterative method:

(a) selecting any initial trial values for $w = w_1 w_2 \ldots w_n$;

(b) inputting to said circuit one of the sample input sequences $x_q = x_{q1} x_{q2} \ldots x_{qn}$, wherein $1 \leq q \leq k$, and observing the resulting j-th output bit, wherein the j-th output bit is the output of the j-th said output neuron;

(c) if the resulting j-th output bit is high and $y_{qj}$ is low, then updating w by subtracting $x_q$ from w; if the resulting j-th output bit is low and $y_{qj}$ is high, then updating w by adding $x_q$ to w; or if the resulting j-th output bit equals $y_{qj}$, then leaving w unchanged; and (d) iterating steps (a), (b), and (c) for all sample input vectors x and for all outputs until the resulting j-th output bit equals $y_{qj}$ in all cases, whereby the values of the weight vectors resulting after said iterating is complete become the weight vectors for the correlations defined by the selected sample.

5. A circuit as recited in claim 3, wherein each of said weight vectors w is equal to a weight vector whose elements $w_j$ are:

$$w_j = \begin{cases} -1 & \text{if } x_{ij} = 0 \\ 1 & \text{if } x_{ij} = 1 \\ 1 - s_i & \text{for } j = n + 1; \end{cases}$$

wherein $s_i$ is defined as the sum $S_i = X_{i1} + X_{i2} + \ldots + X_{in}$.

6. A circuit as recited in claim 3, wherein said generating of each of said weight vectors w in step (b) of claim 3 comprises the following iterative method:

(a) selecting initial trial values for each $w_j$ as follows:

$$w_j = \begin{cases} -1 + r_j & \text{if } x_{ij} = 0 \\ 1 + r_j & \text{if } x_{ij} = 1 \\ 1 - s_i + r_j & \text{for } j = n + 1; \end{cases}$$

wherein $S_i$ is defined as the sum $S_i = x_{i1} + x_{i2} + \ldots + x_{in}$; and $r_j$ is a randomly chosen real number greater than or equal to 0, and less than 1; and (1)) for every j not equal to i, if $\sigma_j > 0$, finding an l such that $x_{il}$ is not equal to $x_{jl}$; then if $x_{jl} = 1$, updating $w_l$ by subtracting $\sigma_j$ from $w_l$, or if $x_{jl} = 0$, updating $w_l$ by adding $\sigma_j$ to $w_l$, and also updating $w_{n+1}$ by subtracting $\sigma_j$ from $w_{n+1}$; where $\sigma_j$ is defined as the inner product $\sigma_j = x_j \cdot w$.

7. A circuit as recited in claim 3, wherein said generating of each of said weight vectors w in Step (b) of claim 3 comprises the following iterative method:

(a) selecting initial trial values for each element $w_j$ of w as follows:

$$w_j = \begin{cases} -p(j) & \text{if } x_{ij} = 0 \\ p(j) & \text{if } x_{ij} = 1 \\ R - (p(1)x_{ij} + p(2)x_{i2} + \ldots + p(n)x_m) & \text{for } j = n + 1; \end{cases}$$

wherein p(j) is a function of j, and R is a function of all the p(j)'s;

(b) updating each $w_j$ by adding to it a number $r_j$, where $r_j$ is a number less than or equal to a, and greater than or equal to b, wherein a is a real number and wherein b is a real number;

(c) for every j not equal to i, calculating $\sigma_j \times x_j \cdot w$; then if $\sigma_j > 0$, choosing a positive integer T and iterating steps (d) and (e) below T times:

(d) finding an l such that $x_{il}$ is not equal to $x_{jl}$;

(e) if $x_{il} = 1$, updating $w_l$ by adding $\sigma_j / T$ to $w_l$, and updating $w_{n+1}$ by subtracting $\sigma_j / T$ from $w_{n+1}$; or if $x_{il} = 0$, updating $w_l$ by subtracting $\sigma_j / T$ from $w_l$.

8. A circuit as recited in claim 7, wherein $a < 0 < b$, and $|a| << |b|$.

* * * * *